United States Patent
Weiss et al.

(10) Patent No.: US 11,005,913 B1
(45) Date of Patent: May 11, 2021

(54) SYSTEM FOR OBTAINING INTERNET ACCESS FOR COMPUTING DEVICE TETHERED TO MOBILE DEVICE HAVING INTERNET CONNECTION VIA UNIVERSAL TRANSLATING SOFTWARE ADAPTER AND UNIVERSAL MUXER DATA TRACKER

(71) Applicant: TeliApp Corporation, Linden, NJ (US)

(72) Inventors: Joshua Weiss, Linden, NJ (US); Ian Mathieson, Linden, NJ (US)

(73) Assignee: TeliApp Corporation, Linden, NJ (US)

( * ) Notice: Subject to any disclaimer, the term of this patent is extended or adjusted under 35 U.S.C. 154(b) by 0 days.

(21) Appl. No.: 16/815,845

(22) Filed: Mar. 11, 2020

(51) Int. Cl.
| | |
|---|---|
| *G06F 15/16* | (2006.01) |
| *H04L 29/08* | (2006.01) |
| *H04L 12/24* | (2006.01) |
| *H04L 29/06* | (2006.01) |
| *G06F 13/42* | (2006.01) |
| *G06F 13/20* | (2006.01) |

(52) U.S. Cl.
CPC .............. *H04L 67/02* (2013.01); *G06F 13/20* (2013.01); *G06F 13/4282* (2013.01); *H04L 41/06* (2013.01); *H04L 63/0281* (2013.01); *H04L 67/2814* (2013.01); *G06F 2213/0042* (2013.01)

(58) Field of Classification Search
CPC ....................................................... H04L 67/02
USPC ......................................................... 709/224
See application file for complete search history.

(56) References Cited

U.S. PATENT DOCUMENTS

| | | | |
|---|---|---|---|
| 9,414,281 B2* | 8/2016 | Liu | H04L 45/38 |
| 10,250,948 B1* | 4/2019 | Bortz | H04N 21/2743 |
| 10,631,349 B2* | 4/2020 | Hassan | H04M 15/00 |
| 10,785,197 B2* | 9/2020 | Gonzalez | H04W 12/0808 |
| 2003/0229900 A1* | 12/2003 | Reisman | H04N 21/42204 725/87 |
| 2011/0028085 A1* | 2/2011 | Waung | H04W 88/04 455/7 |
| 2011/0055322 A1* | 3/2011 | Gregersen | H04L 67/2814 709/203 |
| 2011/0119723 A1* | 5/2011 | Erickson | H04L 67/28 725/110 |
| 2011/0164596 A1* | 7/2011 | Montemurro | H04W 76/11 370/338 |
| 2013/0331028 A1* | 12/2013 | Kuehnel | H04W 76/10 455/41.1 |

(Continued)

*Primary Examiner* — Hamza N Algibhah
(74) *Attorney, Agent, or Firm* — Gearhart Law LLC

(57) ABSTRACT

A system configured to obtain Internet access for a computing device tethered to a mobile device having an Internet connection is described. The computing device includes, at least, a listening server configured to receive the one or more data streams from a web browser associated with the mobile device, a loopback device configured to identify the tethered connection between the computer system and the mobile device, a universal translating software adapter comprising a Universal Serial Bus (USB) muxer sequence configured to combine the one or more data streams into a new data stream, a universal muxer data tracker configured to provide a transcription method for the new data stream, a proxy connector configured to re-route the new data stream to a transcriber associated with the mobile device, such that the transcriber is configured to transmit the new data stream received from the proxy connector to the mobile device.

20 Claims, 5 Drawing Sheets

(56) References Cited

U.S. PATENT DOCUMENTS

| | | | | |
|---|---|---|---|---|
| 2014/0254499 | A1* | 9/2014 | Hassan | H04W 12/08 |
| | | | | 370/329 |
| 2016/0007394 | A1* | 1/2016 | Hassan | H04W 76/12 |
| | | | | 455/450 |
| 2016/0073013 | A1* | 3/2016 | Prosserman | H04N 21/42219 |
| | | | | 348/588 |
| 2016/0295622 | A1* | 10/2016 | Huang | H04W 48/18 |
| 2016/0308843 | A1* | 10/2016 | Cassel | H04W 76/12 |
| 2017/0078962 | A1* | 3/2017 | Hassan | H04W 76/10 |
| 2017/0295600 | A1* | 10/2017 | Hassan | H04L 67/1063 |
| 2018/0331904 | A1* | 11/2018 | Mannadiar | H04L 65/605 |
| 2019/0274175 | A1* | 9/2019 | Hassan | H04W 88/04 |
| 2019/0306551 | A1* | 10/2019 | Arye | H04N 21/2662 |

* cited by examiner

SYSTEM FOR OBTAINING INTERNET ACCESS FOR COMPUTING DEVICE TETHERED TO MOBILE DEVICE HAVING INTERNET CONNECTION VIA UNIVERSAL TRANSLATING SOFTWARE ADAPTER AND UNIVERSAL MUXER DATA TRACKER

CROSS-REFERENCE TO RELATED APPLICATIONS

This application is a U.S. Non-Provisional Patent Application that claims priority to U.S. Provisional Application Ser. No. 62/791,215 filed on Jan. 11, 2019, the entire contents of which are hereby incorporated by reference.

FIELD OF THE EMBODIMENTS

The field of the invention and its embodiments relate to an application that enables any computing device, regardless of the operating system, to obtain Internet access by tethering the computing device with a corresponding charging cable to a smartphone or a tablet having Internet access. In particular, the instant invention utilizes a universal translating software adapter and a universal muxer data tracker to do so.

BACKGROUND OF THE EMBODIMENTS

Individuals wish to utilize every available technological tool at their disposal for both productivity and for entertainment. These technological tools include smartphones, tablets, laptop computers, etc. Numerous establishments, such as hotels, malls, fast casual restaurants, and other businesses offer free WiFi to their guests or customers for convenience. However, such free WiFi may be coupled with ransomware, malware, and malicious programming. At times, this free WiFi results in identity theft to the guests or customers. In response to these growing concerns, some users utilize and activate a WiFi hotspot through the user's smartphone or tablet device, in order to provide a safe Internet connection on the users laptop computer. However, this can become expensive. Furthermore, the speed of the Internet associated with the smartphone or tablet device often fails to be transferrable to the users laptop computer.

Multiplexing (or "muxing") was first developed in the telephone industry and has become a popular communication technique, in which multiple streams are combined into one signal over a shared medium, generally to share a scarce resource. For example, in the telecommunications industry, several simultaneous calls may be carried using one wire. The multiplexed (or "muxed") signal is transmitted through a communication channel, such as a cable. The multiplexing divides the capacity of the communication channel into several logical channels, one for each message signal or data stream to be transferred. Such process can be carried out with a multiplexer device (or a "mux" device).

Multiplexing techniques may be divided into analog or digital techniques. Examples of analog multiplexing techniques include Frequency Division Multiplexing (FDM) and Wavelength Division Multiplexing (WDM). In analog multiplexing, the most commonly used technique is FDM, which utilizes various frequencies to combine streams of data for sending them on a communication medium, as a single signal. With WDM, many data streams of different wavelengths are transmitted in the light spectrum. If the wavelength of the light increases, the frequency of the signal decreases. A prism, which can turn different wavelengths into a single line, can be used at the output of MUX and input of DEMUX.

Examples of digital multiplexing techniques include Time Division Multiplexing (TDM). TDM is typically used to transmit a signal over a single communication channel by allotting one slot for each message. Examples of TDM devices include both synchronous and asynchronous techniques. In synchronous TDM, the input is connected to a frame. If there are 'n' number of connections, then the frame is divided into 'n' time slots. One slot is allocated for each input line. In this technique, the sampling rate is common for all signals and hence the same clock input is given. The MUX allocates the same slot to each device at all times. Alternatively, in asynchronous TDM, the sampling rate is different for each of the signals and a common clock is not required. If the allotted device for a time slot transmits nothing and sits idle, then that slot can be allotted to another device.

A reverse process, known as de-multiplexing (or "demuxing") extracts the original channels on the receiver end. A device that performs this reverse process is called a de-multiplexer device (or a "demux" device or a "dmx" device). Inverse multiplexing (or "imux") has the opposite aim as multiplexing, namely, to break one data stream into several streams, transfer them simultaneously over several communication channels, and recreate the original stream of data.

The standard method to interact with a smartphone or a tablet device (such as an iPhone that utilizes Apple's iOS mobile operating system software) through a Universal Serial Bus (USB) cable is through a USB multiplexer or muxer device, which is a program built on top of a pre-existing USB protocol. The standard method to interact with a smartphone or a tablet device (such as an Android device) on the USB protocol level is directly with the raw data. Since data transfer is handled quite differently programmatically by these different devices (one akin to an eventloop and the other to a TCP/IP socket), a need exists for a common data structure that could interact with multiple devices (such as both an iOS and an Android device, having different mobile operating systems).

Review of Related Technology

U.S. Pat. No. 7,788,428 B2 describes a portable electronic device includes a data input/output (I/O) circuit for communicating data to/from the electronic device and first logic operative to control the data I/O circuit in accordance with a first data transfer standard. The first data transfer standard defines a first connector pin out. Also included is second logic, which is different from the first logic, and operative to control the data I/O circuit in accordance with a second data transfer standard. The second data transfer defines a second connector pin out different from the first connector pin out. The device also includes switching logic operative to selectively couple the first logic or the second logic to the data I/O circuit so as to enable operation of the data I/O circuit in accordance with the first data transfer standard or the second data transfer standard. According to this reference, different signal types (e.g., MHL signals and USB signals) can be multiplexed (e.g., physically switched or selected via software) so as to enable both communication standards on the same pin out (e.g., a standard USB 3.0 pin out).

U.S. Pat. No. 7,873,774 B2 describes an apparatus and method in a mobile device having a digital application-specific integrated circuit (DASIC) and a multifunctional integrated circuit (chip) providing additional functions to the mobile device. An internal USB link connects the DASIC and the multifunctional chip. In one embodiment, the multifunctional chip is an ultra-wideband (UWB) Radio Module. The internal USB link may utilize a USB interface, a USB 2.0 Universal Transceiver Macrocell Interface (UMTI+) and Low Pin Interface (ULPI), or a High Speed InterChip (HSIC) interface. The UWB Radio Module communicates over the air with an external remote wireless device such as a wireless USB Host utilizing a UWB radio link. The internal USB link provides connection and maps logical data streams in the DASIC with logical data streams in the UWB Radio Module or multifunctional integrated circuit.

RU 2497186 C2 describes equipment in a mobile device that provides a variety of functions for the mobile device, including: Digital Specialized Integrated Circuit (DASIC) for controlling a mobile device in accordance with applicable radio standards; a first multifunctional integrated circuit implemented separately from DASIC, where the first multifunctional integrated circuit is configured to provide a first plurality of functions; and a first universal serial bus (USB) communication line connecting the DASIC and the first multifunctional integrated circuit. The first USB communication line logically converts the endpoints associated with the first set of functions in the first multifunctional integrated circuit to the local connection endpoints in DASIC.

CN 201122770 Y describes a diplex USB interface and a data line with a diplex USB interface, which is suitable for the equipment transmission field. Through a USB plug and a USB socket, which are integrated on the diplex USB interface simultaneously, and a change-over switch used for switching the work of the USB plug and the USB socket, the packing volume of the USB data line is reduced, thus the appearance is artistic, the operation is easy, and the practicability is strong.

WO 2009/088593 A1 describes a method, apparatus and system for generating and facilitating Mobile High-Definition Multimedia Interface. In one embodiment, an apparatus includes a transmitter configured to receive a high-definition interface package having multiple channels of a high-definition interface, the transmitter including a multiplexer configured to multiplex the multiple channels into a single channel to generate a mobile high-definition interface, the mobile high-definition interface configured to facilitate carrying of high-definition media content in a mobile device. The apparatus further includes a receiver coupled with the transmitter, the receiver configured to receive the single channel, and to unmerge the single channel into the multiple channels.

U.S. Published Patent Application No. 2007/0279408 A1 describes multiple data streams being distributed using conventional data cables and multiplexing circuits by taking advantage of a technique that allows reliable high speed transmission of digital data. In one example, a number of parallel data streams (e.g., video data streams) are serialized to allow them to be economically and reliably transmitted over conventional data cables (e.g., category 5 or category 6 twisted pair cables, and automotive data transmission cables) over long distance. The parallel data streams are recovered by deserializing from the transmitted signal using a data recovery technique that recovers a clocking signal from the transmitted signal. In another example, multiple data streams from multiple asynchronous sources are multiplexed to provide an input data stream to a display device. The multiple data stream may be provided through, for example, conventional connection cables (e.g., DVI, LEONI, CAT5 or CAT6 cables).

Various multiplexing and demultiplexing techniques exist. However, their means of operation are substantially different from the present disclosure, as the other inventions fail to solve all the problems taught by the present disclosure.

SUMMARY OF THE EMBODIMENTS

The present invention and its embodiments relate to an application that enables any computing device, regardless of the operating system, to obtain Internet access by tethering the computing device with a corresponding charging cable to a smartphone or a tablet having Internet access. In particular, the instant invention utilizes a universal translating software adapter and a universal muxer data tracker to do so.

A first embodiment of the instant invention describes a system configured to obtain Internet access for a computing device tethered to a first mobile device or a second mobile device having an Internet connection via a muxing technique. The system includes a web browser configured to transmit one or more data streams to the computing device, a first tether configured to affix the first mobile device to the computing device, a second tether configured to affix the second mobile device to the computing device, and a first application executable on the first and the second mobile device.

According to examples, the first mobile device is associated with a first mobile operating system and the second mobile device is associated with a second mobile operating system. The first mobile operating system differs from the second mobile operating system. For examples, the first mobile operating system may be Apple's iOS mobile operating system and the second mobile operating system may be Android's mobile operating system.

The computing device comprises a second application that is a companion application to the first application executable on the first and/or the second mobile device. In examples, the second application is configured as an extension on another web browser of the computing device.

The computing device also includes a listening server configured to receive the one or more data streams from the web browser and a proxy connector configured to re-route the one or more data streams to a first mobile operating system transcriber associated with the first computing device or a second mobile operating system transcriber associated with the second computing device. The first mobile operating system transcriber is configured to transmit the one or more data streams received from the proxy connector to the first mobile device. The second mobile operating system transcriber is configured to transmit the one or more data streams received from the proxy connector to the second mobile device.

The computing device also includes a universal translating software adapter. The universal translating software adapter comprises a universal, cross-platform, and non-blocking input output (I/O) loop Universal Serial Bus (USB) muxer sequence. The universal translating software adapter allows for integration of a first USB data transfer method associated with the first mobile device and a second USB data transfer method associated with the second mobile device into an existing non-blocking java I/O interface structure.

The computing device additionally includes a universal muxer data tracker that provides a single stream data transcription method. In examples, the universal muxer data tracker is configured to mark each of the one or more data streams with a unique identifier, a length, and/or data content, among other parameters not explicitly listed herein.

The computing device additionally includes a loopback device and a device listener. The loopback device is configured to identify a connection of the first tether to the first mobile device and/or identify a connection of the second tether to the second mobile device. The device listener is configured to monitor and identify one or more events associated with the first and/or the second mobile device. The one or more events may include: the first mobile device becoming untethered from the computing device, the second mobile device becoming untethered from the computing device, the first mobile device being turned off, the second mobile device being turned off, the computing device being turned off, and/or a user minimizing the second application on the computing device, among other events not explicitly listed herein.

A second embodiment of the instant invention describes a method executed by a computing device to obtain Internet access for the computing device tethered to a mobile device having an Internet connection via a muxing technique. The method includes numerous process steps, including: identifying, via a loopback device, a tethered connection between the computer system and the mobile device. The mobile device is associated with a mobile operating system. The method further comprises: monitoring and identifying, via a device listener, one or more events associated with the mobile device; receiving, by a listening server from a web browser associated with the mobile device, one or more data streams; and marking, via a universal muxer data tracker, each of the one or more data streams with a unique identifier, a length, and data content. The method additionally includes: combining, via a universal translating software adapter, the one or more data streams into a new data stream via a multiplexing technique; re-routing, via a proxy connector, the new data stream to a mobile operating system transcriber associated with the mobile device; and transmitting, via the mobile operating system transcriber, the new data stream received from the proxy connector to the mobile device.

In examples, the universal translating software adapter comprises a universal, cross-platform, and non-blocking I/O loop USB muxer sequence. Further, the universal translating software adapter allows for integration of a USB data transfer method associated with the mobile device into an existing non-blocking java I/O interface structure. The method further comprises: monitoring and identifying, via a device listener, one or more events associated with the mobile device. The one or more events may include: the mobile device becoming untethered from the computing device, the mobile device being turned off, the computing device being turned off, and/or a user minimizing the second application on the computing device, among other events not explicitly listed herein.

A third embodiment of the instant invention describes a computer system. The computer system is a computer or a laptop computer. The computer system includes one or more processors, one or more memories, and one or more computer-readable hardware storage devices. The one or more computer-readable hardware storage devices contain program code executable by the one or more processors via the one or more memories to implement a method to obtain Internet access for a computing device tethered to a mobile device having an Internet connection via a muxing technique. The mobile device is a smartphone or a tablet device.

The method includes numerous process steps, such as: identifying, via a loopback device, a tethered connection between the computer system and the mobile device. The mobile device is associated with a mobile operating system. The method further includes: monitoring and identifying, via a device listener, one or more events associated with the mobile device; receiving, by a listening server from a web browser associated with the mobile device, one or more data streams; and marking, via a universal muxer data tracker, each of the one or more data streams with a unique identifier, a length, and data content. The method further includes: combining, via a universal translating software adapter, the one or more data streams into a new data stream via a multiplexing technique. The universal translating software adapter allows for integration of a USB data transfer method associated with the mobile device into an existing non-blocking java I/O interface structure. The multiplexing technique of the universal translating software adapter comprises a universal, cross-platform, and non-blocking I/O loop USB muxer sequence.

The method further includes: re-routing, via a proxy connector, the new data stream to a mobile operating system transcriber associated with the mobile device; and transmitting, via the mobile operating system transcriber, the new data stream received from the proxy connector to the mobile device.

In general, the present invention succeeds in conferring the following benefits and objectives.

It is an object of the present invention to provide a method to obtain Internet access for a computing device tethered to a mobile device via a muxing technique.

It is an object of the present invention to provide a method to obtain Internet access for a computing device tethered to a mobile device via a universal translating software adapter and a universal muxer data tracker.

It is an object of the present invention to provide a system to obtain Internet access for a computing device tethered to a mobile device via a muxing technique.

It is an object of the present invention to provide a method and/or a system to obtain Internet access for a computing device tethered to a mobile device or a tablet device via a muxing technique that does not require use or activation of a WiFi hotspot through the mobile device or the tablet device.

It is an object of the present invention to provide a method and/or a system to obtain Internet access for a computing device tethered to a mobile device or a tablet device that has an increased Internet stability, as compared to use of a WiFi hotspot through the mobile device or the tablet device.

It is an object of the present invention to provide a method and/or a system to obtain Internet access for a computing device tethered to a mobile device or a tablet device via a muxing technique that does not require rooting of any device.

It is an object of the present invention to provide a method and/or a system to obtain Internet access for a computing device tethered to a mobile device or a tablet device via a muxing technique that does not require jailbreaking of any device.

It is an object of the present invention to provide a method and/or a system to obtain Internet access for a computing device tethered to a mobile device or a tablet device, where an Internet connectivity speed on the mobile device mirrors an Internet connectivity speed on the computing device, without throttling the Internet connectivity speed, as typically done by network providers.

It is an object of the present invention to provide a method and/or a system to obtain Internet access having enhanced security for a computing device tethered to a mobile device or a tablet device.

It is an object of the present invention to provide a method and/or a system to obtain Internet access providing cyber defense for a computing device tethered to a mobile device or a tablet device, where the cyber defense includes blocking non-secure websites, encrypting all the Domain Name System (DNS) requests made by web browsers, and protecting Internet searches from third-party tracking.

It is an object of the present invention to provide a method and/or a system to obtain Internet access for a computing device tethered to a mobile device or a tablet device, where the method and/or the system filters out malicious software prior to it reaching the computing device.

It is an object of the present invention to provide a method and/or a system to obtain Internet access for a computing device tethered to a mobile device or a tablet device, where the method and/or the system: provides invisibility to potential hackers on local WiFi networks, uses Hypertext Transfer Protocol Secure (HTTPS) Requests Only to block all non-secured websites, uses DNS Over HTTPS Only to encrypt all DNS requests made by the computing device's web browser, and protects the computing device from third-party tracking.

DESCRIPTION OF THE PREFERRED EMBODIMENTS

Figure 1:
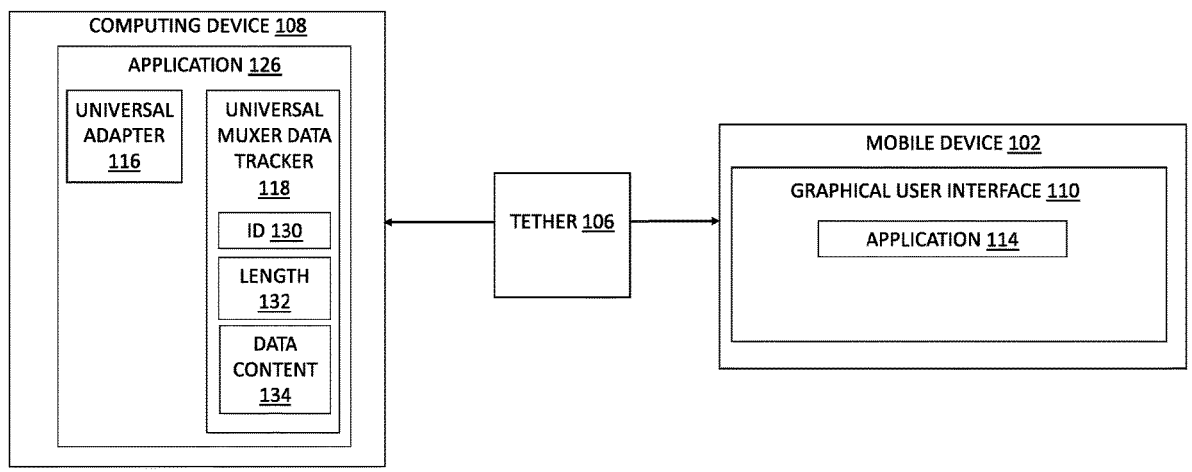
FIG. 1 depicts a perspective view of a system configured to implement a method to obtain Internet access for a computing device tethered to a mobile device via a muxing technique, in accordance with embodiments of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

As defined herein, a "channel" refers to an open connection to an entity, such as a hardware device, a file, a network socket, or a program component, that is capable of performing one or more distinct input output (I/O) operations, for example reading or writing. A channel may be either open or closed. A channel is open upon creation, and once closed it remains closed. Channels are, in general, intended to be safe for multithreaded access as described in the specifications of the interfaces and classes that extend and implement this interface.

As defined herein, a "thread" is an independent path of execution within a program. Many threads can run concurrently within a program.

As described herein, "non-blocking input output (I/O)" refers to code that does not block execution. For example, Java's non-blocking I/O enables a thread to request reading data from a channel, and only get what is currently available, or nothing at all, if no data is currently available. Rather than remain blocked until data becomes available for reading, the thread can go on to perform another task. The same concept applies for non-blocking writing. A thread can request that some data be written to a channel, but not wait for it to be fully written. The thread can go on and perform another task in the meantime. What threads spend their idle time on when not blocked in I/O calls, is usually performing I/O on other channels in the meantime. That is, a single thread can now manage multiple channels of input and output.

As an example, "blocking 10" means that a given thread cannot do anything more until the I/O is fully received (e.g., is blocked until there is some data to read, or the data is fully written).

As shown in FIG. 1, a system configured to implement a method to obtain Internet access for a computing device tethered to a mobile device via a muxing technique is depicted. As defined herein, "muxing" or "multiplexing" is a communication technique in which multiple streams are combined into one signal over a shared medium, generally to share a scarce resource. For example, in the telecommunications industry, several simultaneous calls may be carried using one wire. The multiplexed (or "muxed") signal is transmitted through a communication channel, such as a cable (described herein as a tether 106). The multiplexing divides the capacity of the communication channel into several logical channels, one for each message signal or data stream to be transferred. Such process can be carried out with a multiplexer device (or a "mux" device).

The system of FIG. 1 includes a mobile device 102 and a computing device 108. The mobile device 102 may be a smartphone or a tablet, among other examples not explicitly listed herein. The computing device 108 may be a computer or a laptop computer, among other examples not explicitly listed herein.

The mobile device 102 may include a first application 114 and a graphical user interface (GUI) 110. A user may interact directly with the first application 114 via the GUI 110 of the mobile device 102. The computing device 108 may include a second application 126, which serves as a companion application to the first application 114 of the mobile device 102. In examples, the second application 126 may be configured as an extension on a web browser of the computing device 108.

The mobile device 102 may be connected to the computing device 108 via a tether 106. The tether 106 may be a Universal Serial Bus (USB) cable, a conventional data cable, among other components not explicitly listed herein. For example, a first port of the mobile device 102 may receive a first end of the tether 106 and a second port of the computing device 108 may receive a second end of the tether 106, where the first end of the tether 106 is disposed opposite the second end of the tether 106.

Figure 3:
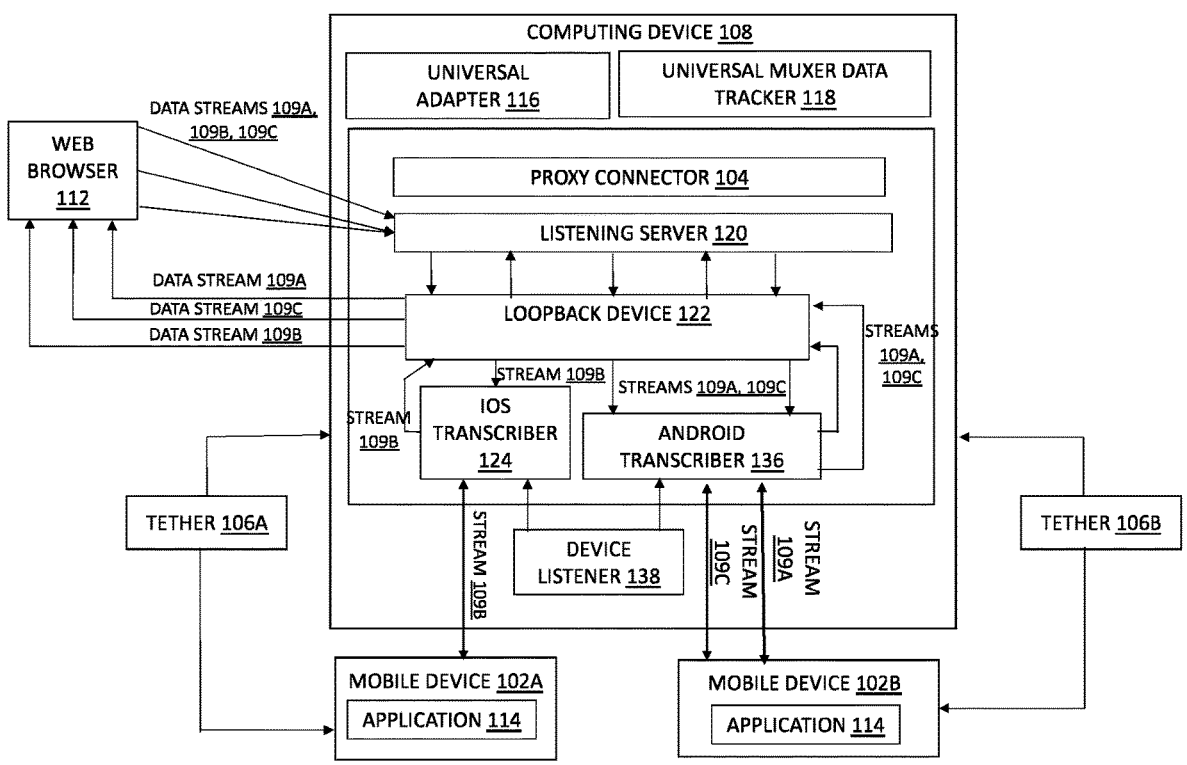
FIG. 3 depicts another perspective view of a system configured to implement a method to obtain Internet access for a computing device tethered to a mobile device via a muxing technique, in accordance with embodiments of the present invention.

Typically, in the field, where the mobile device 102 utilizes Apple's iOS mobile operating system, the mobile device 102 may utilize the USB cable as the tether 106 through a USB multiplexer or muxer device. In examples where the mobile device 102 utilizes an Android mobile operating system, the mobile device 102 on the USB protocol level interacts directly with the raw data. Since data transfers are handled differently by these two mobile operating systems, a need exists for a common data structure that could interact with multiple devices having differing operating systems. The instant invention addresses this need via a universal translating software adapter 116 and a universal muxer data tracker 118, as depicted in FIG. 1 and FIG. 3.

Figure 2A:
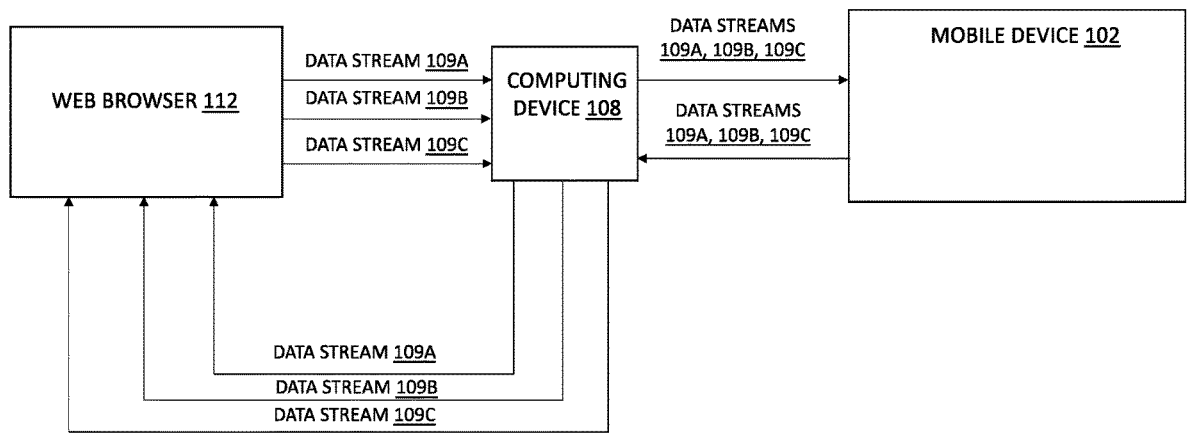
FIG. 2A depicts a perspective view of a system utilizing a muxing technique, in accordance with embodiments of the present invention.

A system utilizing a muxing technique is depicted in FIG. 2A. As shown, one or more data streams 109A, 109B, 109C are transmitted from a web browser 112 to the computing device 108. As described, the computing device 108 includes the universal translating software adapter 116 and the universal muxer data tracker 118, as depicted in FIG. 1 and FIG. 3.

The universal translating software adapter 116 of the computing device 108 comprises a universal, cross-platform, and non-blocking input output (I/O) loop USB muxer sequence that allows for integration of multiple USB data transfer methods associated with multiple mobile devices into an existing non-blocking java I/O interface structure.

The universal muxer data tracker 118 of the computing device 108 provides a single stream data transcription method that utilizes a muxing technique. As shown, the universal muxer data tracker 118 utilizes the muxing technique to combine the one or more data streams 109A, 109B, 109C into a new data stream (depicted as data streams 109A, 109B, 109C). In examples and as depicted in FIG. 1, the universal muxer data tracker 118 is additionally configured to mark each of the one or more data streams 109A, 109B, 109C with a unique identifier 130, a length 132 associated with each of the one or more data streams 109A, 109B, 109C, and/or data content 134 associated with each of the one or more data streams 109A, 109B, 109C, among other parameters not explicitly listed herein. As such, use of the universal muxer data tracker 118 provides a single stream data transcription method since each of the one or more data streams 109A, 109B, 109C may be individually tracked. The universal muxer data tracker 118 allows for the tracking ability of each of the one or more data streams 109A, 109B, 109C, even though each of the one or more data streams 109A, 109B, 109C have been condensed into a single stream (e.g., the new data stream described as data streams 109A, 109B, 109C) prior to transmission to the mobile device 102.

Figure 2B:
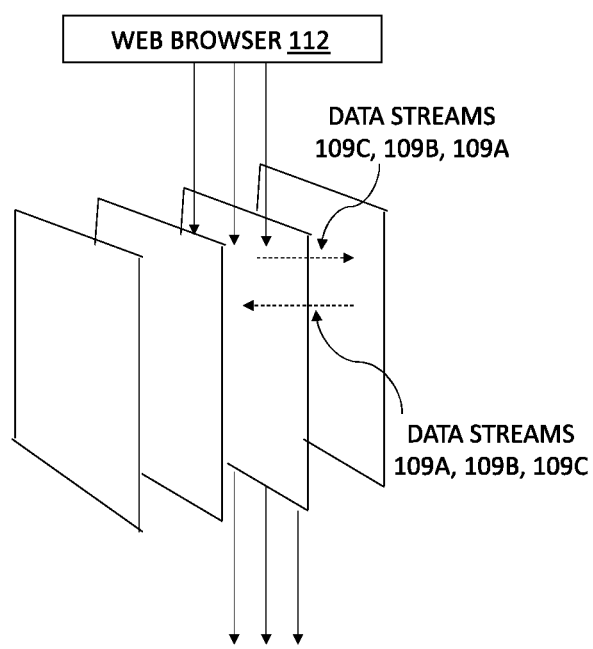
FIG. 2B depicts a perspective view of numerous data streams associated with a web browser of a system configured to implement a method to obtain Internet access for a computing device tethered to a mobile device via a muxing technique, in accordance with embodiments of the present invention.

As shown in FIG. 3, a system configured to obtain Internet access for the computing device 108 tethered to a first mobile device 102A or a second mobile device 102B having an Internet connection via a muxing technique is described. As depicted in FIG. 2A, FIG. 2B, and FIG. 3, the system includes a web browser 112 that is configured to transmit the one or more data streams 109A, 109B, 109C to the computing device 108. A first tether 106A (such as the tether 106 of FIG. 1) is configured to affix the first mobile device 102A to the computing device 108. The first mobile device 102A is associated with a first mobile operating system, such as Apple's iOS mobile operating system. Moreover, a second tether 106B (such as the tether 106 of FIG. 1) is configured to affix the second mobile device 102B to the computing device 108. The second mobile device 102B is associated with a second mobile operating system, such as the Android mobile operating system. As such, the first mobile operating system differs from the second mobile operating system. It should be appreciated that the mobile operating systems described herein are for illustrative purposes only and other mobile operating systems are contemplated, which are not explicitly listed.

According to examples, a first application 114 is executable on the first mobile device 102A and the second mobile device 102B. The computing device 108 includes a second application 126 (as depicted in FIG. 1). In examples, the second application 126 is a companion application to the first application 114. In other examples, the second application 126 is configured as an extension on another web browser of the computing device 108.

The computing device 108 includes numerous components, engines, and/or applications. For example, the computing device 108 includes a loopback device 122 that serves as a programmable version of a wired Ethernet connection. In general, loopback devices are used to test a connection for link or data transmission capabilities, or to verify if a connection works. The loopback device 122 of the instant invention is configured to identify a connection of the first tether 106A to the first mobile device 102A and/or identify a connection of the second tether 106B to the second mobile device 102B.

In further examples, the computing device 108 includes a device listener 138. The device listener 138 is configured to monitor and identify one or more events associated with the first mobile device 102A and/or the second mobile device 102B. The one or more events may include: the first mobile device 102A becoming untethered from the computing device 108, the second mobile device 102B becoming untethered from the computing device 108, the first mobile device 102A being turned off, the second mobile device 102B being turned off, the computing device 108 being turned off, and a user minimizing the second application 126 on the computing device 108.

The computing device 108 further includes a listening server 120 configured to receive the one or more data streams 109A, 109B, 109C from the web browser 112. The computing device 108 also includes the universal muxer data tracker 118 that is configured to provide a single stream data transcription method. In examples, the universal muxer data tracker 118 is configured to mark each of the one or more data streams 109A, 109B, 109C with a unique identifier 130, a length 132 associated with each of the one or more data streams 109A, 109B, 109C, and data content 134 associated with each of the one or more data streams 109A, 109B, 109C, as depicted in FIG. 1. Use of the universal muxer data tracker 118 provides a single stream data transcription method since each of the one or more data streams 109A, 109B, 109C are individually tracked. The universal muxer data tracker 118 allows for the tracking ability of each of the one or more data streams 109A, 109B, 109C, even after each of the one or more data streams 109A, 109B, 109C have been condensed into a single stream (e.g., the new data stream, described as data streams 109A, 109B, 109C).

The computing device 108 also includes the universal translating software adapter 116. The universal translating software adapter 116 comprises a universal, cross-platform, and non-blocking I/O loop USB muxer sequence that combines the one or more data streams 109A, 109B, 109C into the new data stream (described as data streams 109A, 109B, 109C) via a multiplexing technique. Moreover, the universal translating software adapter 116 allows for integration of a first USB data transfer method associated with the first mobile device 102A and a second USB data transfer method associated with the second mobile device 102B into an existing non-blocking java I/O interface structure.

The computing device 108 further includes a proxy connector 104 configured to re-route the one or more data streams 109A, 109B, 109C to a first mobile operating system transcriber 124 associated with the first computing device 102A or a second mobile operating system transcriber 136 associated with the second computing device 102B. As illustrated in FIG. 3, the first mobile operating system transcriber 124 is associated with Apple's iOS mobile operating system and the second mobile operating system transcriber 136 is associated with the Android's mobile operating system. However, it should be appreciated that the mobile operating systems described herein are for illustrative purposes only and other mobile operating systems are contemplated.

The first mobile operating system transcriber 124 is configured to transmit the data stream 109B of the one or more data streams 109A, 109B, 109C associated with the first mobile operating system (e.g., the iOS mobile operating system) received from the proxy connector 104 to the first mobile device 102A. The first mobile device 102A is associated with the first mobile operating system (e.g., the iOS mobile operating system). Moreover, the second mobile operating system transcriber 136 is configured to transmit data stream 109A and data stream 109C of the one or more data streams 109A, 109B, 109C associated with the second mobile operating system (e.g., Android's mobile operating system) received from the proxy connector 104 to the second mobile device 102B. It should be appreciated that the second mobile device 102B is associated with the Android mobile operating system. However, it should be appreciated that the mobile operating systems described herein are for illustrative purposes only. For example, the first mobile operating system transcriber 124, the second mobile operating system transcriber 136, the first mobile device 102A, and the second mobile device 102B may be associated with other mobile operating systems not explicitly listed herein.

The computer system described herein provides enhanced security and cyber defense to the user. Where use of public and non-secure WiFi exposes a user's computing device 108 to security vulnerabilities and hacker exploitation, the system of the instant invention provides a workable solution that offers cyber defense including blocking non-secure websites, encrypting all DNS requests made by computing device 108 web browsers, and protecting Internet searches from third-party tracking. Where conventional computer security software quarantines identified malicious software after it is already on the computing device 108, the instant invention filters it out before it reaches the computing device 108. Moreover, the instant invention allows the user to connect a work computing device 108 to the Internet when the user is not connected to a virtual private network (VPN), ensuring local files are not compromised.

The instant system provides invisibility to potential hackers on local WiFi networks, blocks all non-secured websites, encrypts all DNS requests made by a web browser of the computing device 108, and protects the computing device 108 from third-party tracking. The system of the instant invention further provides a stable Internet connection between the mobile device (the mobile device 102 of FIG. 1 and FIG. 2, the first mobile device 102A of FIG. 3, and the second mobile device 102B of FIG. 3) and the computing device 108 and additionally offers the computing device 108 the Internet connectivity speed that the mobile device (the mobile device 102 of FIG. 1 and FIG. 2, the first mobile device 102A of FIG. 3, and the second mobile device 102B of FIG. 3) has, without throttling by network providers.

As explained supra, in some embodiments, the present invention may be a computer system, a computing device, and/or a method. For example, the computer system may be utilized to implement a method for obtaining Internet access for the computing device 108 tethered to the first mobile device 102A or the second mobile device 102B via a muxing technique.

Figure 4:
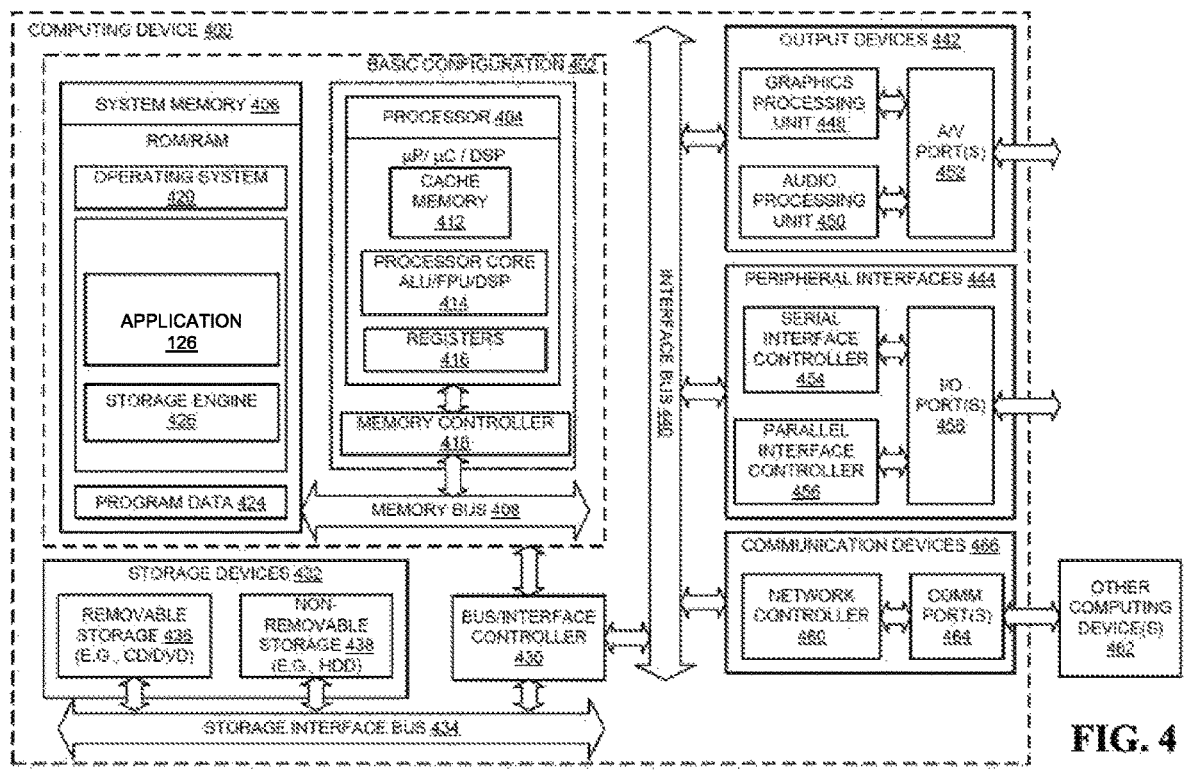
FIG. 4 depicts a block diagram of a computing device included within the system of FIG. 1, FIG. 2A, and FIG. 3 that is configured to obtain Internet access for a computing device tethered to a mobile device via a muxing technique, in accordance with embodiments of the present invention.

A basic configuration 402 of a computing device 400 (similar to the computing device 108 of FIG. 1, FIG. 2A, and FIG. 3) is illustrated in FIG. 4 by those components within the inner dashed line. In the basic configuration 402 of the computing device 400, the computing device 400 includes a processor 404 and a system memory 406. In some examples, the computing device 400 may include one or more processors and the system memory 406. A memory bus 408 is used for communicating between the one or more processors 404 and the system memory 406.

Depending on the desired configuration, the processor 404 may be of any type, including, but not limited to, a microprocessor (μP), a microcontroller (μC), and a digital signal processor (DSP), or any combination thereof. Further, the processor 404 may include one more levels of caching, such as a level cache memory 412, a processor core 414, and registers 416, among other examples. The processor core 414 may include an arithmetic logic unit (ALU), a floating point unit (FPU), and/or a digital signal processing core (DSP Core), or any combination thereof. A memory controller 418 may be used with the processor 404, or, in some implementations, the memory controller 418 may be an internal part of the memory controller 404.

Depending on the desired configuration, the system memory 406 may be of any type, including, but not limited to, volatile memory (such as RAM), and/or non-volatile memory (such as ROM, flash memory, etc.), or any combination thereof. The system memory 406 includes an operating system 420, one or more engines, such as an application 126, and program data 424. In some embodiments, the application 126 may be a module, an engine, a software program, a service, or a software platform, as described infra.

The method executed by the computing device 400 includes numerous process steps, such as: identifying, via the loopback device 122, a tethered connection between the computing device 400 and the mobile device (the mobile device 102 of FIG. 1 and FIG. 2, the first mobile device 102A of FIG. 3, and the second mobile device 102B of FIG. 3); monitoring and identifying, via the device listener 138, one or more events associated with the mobile device (the mobile device 102 of FIG. 1 and FIG. 2, the first mobile device 102A of FIG. 3, and the second mobile device 102B of FIG. 3); and receiving, by a listening server 120 from a web browser 122 associated with the mobile device (the mobile device 102 of FIG. 1 and FIG. 2, the first mobile device 102A of FIG. 3, and the second mobile device 102B of FIG. 3), the one or more data streams 109A, 109B, 109C.

The method may further include: marking, via the universal muxer data tracker 118, each of the one or more data streams 109A, 109B, 109C with a unique identifier 130, a length 132 associated with each of the one or more data streams 109A, 109B, 109C, and data content 134 associated with each of the one or more data streams 109A, 109B, 109C and combining, via the universal translating software adapter 116, the one or more data streams 109A, 109B, 109C into a new data stream (e.g., the data streams 109A, 109B, 109C) via the multiplexing technique. Further, the multiplexing technique of the universal translating software adapter 116 comprises a universal, cross-platform, and non-blocking I/O loop USB muxer sequence.

The method may additionally include: re-routing, via the proxy connector 104, the new data stream (e.g., the data streams 109A, 109B, 109C) to a mobile operating system transcriber (such as the first mobile operating system transcriber 124 and the second mobile operating system transcriber 136) associated with the mobile device (such as the mobile device 102 of FIG. 1 and FIG. 2, the first mobile device 102A of FIG. 3, and the second mobile device 102B of FIG. 3) and transmitting, via the mobile operating system transcriber (e.g., the first mobile operating system transcriber 124 or the second mobile operating system transcriber 126), the new data stream (e.g., the data streams 109A, 109B, 109C) received from the proxy connector 104 to the mobile device (such as the mobile device 102 of FIG. 1 and FIG. 2, the first mobile device 102A of FIG. 3, and the second mobile device 102B of FIG. 3). Further, the computing device 400 may comprise a storage engine 426, which may be configured to store information used or accessed by the application 126.

Moreover, the computing device 400 may have additional features or functionality, and additional interfaces to facilitate communications between the basic configuration 402 and any desired devices and interfaces. For example, a bus/interface controller 430 is used to facilitate communications between the basic configuration 402 and data storage devices 432 via a storage interface bus 434. The data storage devices 432 may be one or more removable storage devices 436, one or more non-removable storage devices 438, or a combination thereof. Examples of the one or more removable storage devices 436 and the one or more non-removable storage devices 438 include magnetic disk devices (such as flexible disk drives and hard-disk drives (HDD)), optical disk drives (such as compact disk (CD) drives or digital versatile disk (DVD) drives), solid state drives (SSD), and tape drives, among others.

In some embodiments, an interface bus 440 facilitates communication from various interface devices (e.g., one or more output devices 442, one or more peripheral interfaces 444, and one or more communication devices 466) to the basic configuration 402 via the bus/interface controller 430. Some of the one or more output devices 442 include a graphics processing unit 448 and an audio processing unit 450, which are configured to communicate to various external devices, such as a display or speakers, via one or more A/V ports 452. The one or more peripheral interfaces 444 may include a serial interface controller 454 or a parallel interface controller 456, which are configured to communicate with external devices, such as input devices (e.g., a keyboard, a mouse, a pen, a voice input device, or a touch input device, etc.) or other peripheral devices (e.g., a printer or a scanner, etc.) via one or more I/O ports 458. Further, the one or more communication devices 466 may include a network controller 460, which is arranged to facilitate communication with one or more other computing devices 462 over a network communication link via one or more communication ports 464. The one or more other computing devices 462 include servers, the database, mobile devices, and comparable devices.

The network communication link is an example of a communication media. The communication media are typically embodied by the computer-readable instructions, data structures, program modules, or other data in a modulated data signal, such as a carrier wave or other transport mechanism, and include any information delivery media. A "modulated data signal" is a signal that has one or more of its characteristics set or changed in such a manner as to encode information in the signal. By way of example, and not limitation, the communication media may include wired media (such as a wired network or direct-wired connection) and wireless media (such as acoustic, radio frequency (RF), microwave, infrared (IR), and other wireless media). The term "computer-readable media," as used herein, includes both storage media and communication media.

It should be appreciated that the system memory 406, the one or more removable storage devices 436, and the one or more non-removable storage devices 438 are examples of the computer-readable storage media. The computer-readable storage media is a tangible device that can retain and store instructions (e.g., program code) for use by an instruction execution device (e.g., the computing device 400). Any such, computer storage media is part of the computing device 400.

The computer readable storage media/medium can be a tangible device that can retain and store instructions for use by an instruction execution device. The computer readable storage media/medium may be, for example, but is not limited to, an electronic storage device, a magnetic storage device, an optical storage device, an electromagnetic storage device, and/or a semiconductor storage device, or any suitable combination of the foregoing. A non-exhaustive list of more specific examples of the computer readable storage media/medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and/or a mechanically encoded device (such as punch-cards or raised structures in a groove having instructions recorded thereon), and any suitable combination of the foregoing. A computer readable storage medium, as used herein, is not to be construed as being transitory streams per se, such as radio waves or other freely propagating electromagnetic waves, electromagnetic waves propagating through a waveguide or other transmission media (e.g., light pulses passing through a fiber-optic cable), or electrical streams transmitted through a wire.

Aspects of the present invention are described herein regarding illustrations and/or block diagrams of methods, computer systems, and computing devices according to embodiments of the invention. It will be understood that each block in the block diagrams, and combinations of the blocks, can be implemented by the computer-readable instructions (e.g., the program code).

The computer-readable instructions are provided to the processor 404 of a general purpose computer, special purpose computer, or other programmable data processing apparatus (e.g., the computing device 400) to produce a machine, such that the instructions, which execute via the processor 404 of the computer or other programmable data processing apparatus, create means for implementing the functions/acts specified in the block diagram blocks. These computer-readable instructions are also stored in a computer-readable storage medium that can direct a computer, a programmable data processing apparatus, and/or other devices to function in a particular manner, such that the computer-readable storage medium having instructions stored therein comprises an article of manufacture including instructions, which implement aspects of the functions/acts specified in the block diagram blocks.

The computer-readable instructions (e.g., the program code) are also loaded onto a computer (e.g. the computing device 400), another programmable data processing apparatus, or another device to cause a series of operational steps to be performed on the computer, the other programmable apparatus, or the other device to produce a computer implemented process, such that the instructions, which execute on the computer, the other programmable apparatus, or the other device, implement the functions/acts specified in the block diagram blocks.

Computer readable program instructions described herein can also be downloaded to respective computing/processing devices from a computer readable storage medium or to an external computer or external storage device via a network (e.g., the Internet, a local area network, a wide area network, and/or a wireless network). The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer/computing device, partly on the user's computer/computing device, as a stand-alone software package, partly on the user's computer/computing device and partly on a remote computer/computing device or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. It should be appreciated that the computer systems and computing devices described herein comprise multiplexing circuits.

Aspects of the present invention are described herein with reference to block diagrams of methods, computer systems, and computing devices according to embodiments of the invention. It will be understood that each block and combinations of blocks in the diagrams, can be implemented by the computer readable program instructions.

The block diagrams in the Figures illustrate the architecture, functionality, and operation of possible implementations of computer systems, methods, and computing devices according to various embodiments of the present invention. In this regard, each block in the block diagrams may represent a module, a segment, or a portion of executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block and combinations of blocks can be implemented by special purpose hardware-based systems that perform the specified functions or acts or carry out combinations of special purpose hardware and computer instructions.

Another embodiment of the invention provides a method that performs the process steps on a subscription, advertising, and/or fee basis. That is, a service provider can offer to assist in the method steps to obtain Internet access for a computing device tethered to a mobile device via a muxing technique. In this case, the service provider can create, maintain, and/or support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A system configured to obtain Internet access for a computing device tethered to a first mobile device or a second mobile device having an Internet connection via a muxing technique, the system comprising:
   a web browser configured to transmit one or more data streams to the computing device;
   a first tether configured to affix the first mobile device to the computing device, wherein the first mobile device is associated with a first mobile operating system;
   a second tether configured to affix the second mobile device to the computing device, wherein the second mobile device is associated with a second mobile operating system, and wherein the first mobile operating system differs from the second mobile operating system;
a first application executable on the first and the second mobile device; and
a computing device comprising:
a second application;
a universal translating software adapter;
a universal muxer data tracker;
a listening server configured to receive the one or more data streams from the web browser;
a proxy connector configured to re-route the one or more data streams received by the listening server to a first mobile operating system transcriber associated with the first computing device or a second mobile operating system transcriber associated with the second computing device;
the first mobile operating system transcriber being configured to transmit the one or more data streams received from the proxy connector to the first mobile device;
the second mobile operating system transcriber configured to transmit the one or more data streams received from the proxy connector to the second mobile device;
a loopback device; and
a device listener.

2. The system of claim 1, wherein the second application is a companion application to the first application.

3. The system of claim 1, wherein the second application is configured as an extension on another web browser of the computing device.

4. The system of claim 1, wherein the universal translating software adapter comprises a universal, cross-platform, and non-blocking input output (I/O) loop Universal Serial Bus (USB) muxer sequence.

5. The system of claim 4, wherein the universal translating software adapter allows for integration of a first USB data transfer method associated with the first mobile device and a second USB data transfer method associated with the second mobile device into an existing non-blocking java I/O interface structure.

6. The system of claim 1, wherein the universal muxer data tracker provides a single stream data transcription method.

7. The system of claim 6, wherein the universal muxer data tracker is configured to:
mark each of the one or more data streams with a parameter selected from the group consisting of: a unique identifier, a length, and data content.

8. The system of claim 1, wherein the loopback device is configured to identify a connection of the first tether to the first mobile device.

9. The system of claim 1, wherein the loopback device is configured to identify a connection of the second tether to the second mobile device.

10. The system of claim 1, wherein the device listener is configured to:
monitor and identify one or more events associated with the first mobile device and/or the second mobile device.

11. The system of claim 10, wherein the one or more events associated with the first mobile device and/or the second mobile device are selected from the group consisting of: the first mobile device becoming untethered from the computing device, the second mobile device becoming untethered from the computing device, the first mobile device being turned off, the second mobile device being turned off, the computing device being turned off, and a user minimizing the second application on the computing device.

12. A method executed by a computing device to obtain Internet access for the computing device tethered to a mobile device having an Internet connection via a muxing technique, the method comprising:
identifying, via a loopback device, a tethered connection between the computing device and the mobile device, wherein the mobile device is associated with a mobile operating system;
monitoring and identifying, via a device listener, one or more events associated with the mobile device;
receiving, by a listening server from a web browser associated with the mobile device, one or more data streams;
marking, via a universal muxer data tracker, each of the one or more data streams with a unique identifier, a length, and data content;
combining, via a universal translating software adapter, the one or more data streams into a new data stream via a multiplexing technique;
re-routing, via a proxy connector, the new data stream to a mobile operating system transcriber associated with the mobile device; and
transmitting, via the mobile operating system transcriber, the new data stream received from the proxy connector to the mobile device.

13. The method of claim 12, wherein the universal translating software adapter comprises a universal, cross-platform, and non-blocking input output (I/O) loop Universal Serial Bus (USB) muxer sequence.

14. The method of claim 12, wherein the universal translating software adapter allows for integration of a Universal Serial Bus (USB) data transfer method associated with the mobile device into an existing non-blocking java input/output (I/O) interface structure.

15. The method of claim 12, further comprising:
monitoring and identifying, via a device listener, one or more events associated with the mobile device, wherein the one or more events associated with the mobile device are selected from the group consisting of: the mobile device becoming untethered from the computing device, the mobile device being turned off, the computing device being turned off, and a user minimizing the second application on the computing device.

16. A computer system comprising one or more processors, one or more memories, and one or more computer-readable hardware storage devices, the one or more computer-readable hardware storage devices containing program code executable by the one or more processors via the one or more memories to implement a method to obtain Internet access for a computing device tethered to a mobile device having an Internet connection via a muxing technique, the method comprising:
identifying, via a loopback device, a tethered connection between the computing device and the mobile device, wherein the mobile device is associated with a mobile operating system;
monitoring and identifying, via a device listener, one or more events associated with the mobile device;
receiving, by a listening server from a web browser associated with the mobile device, one or more data streams;
marking, via a universal muxer data tracker, each of the one or more data streams with a unique identifier, a length, and data content;

combining, via a universal translating software adapter, the one or more data streams into a new data stream via a multiplexing technique;

re-routing, via a proxy connector, the new data stream to a mobile operating system transcriber associated with the mobile device; and transmitting, via the mobile operating system transcriber, the new data stream received from the proxy connector to the mobile device.

17. The computer system of claim 16, wherein the universal translating software adapter allows for integration of a Universal Serial Bus (USB) data transfer method associated with the mobile device into an existing non-blocking java input/output (I/O) interface structure.

18. The computer system of claim 16, wherein the computer system is selected from the group consisting of: a computer and a laptop computer.

19. The computer system of claim 16, wherein the mobile device is selected from the group consisting of: a smartphone and a tablet device.

20. The computer system of claim 16, wherein the multiplexing technique of the universal translating software adapter comprises a universal, cross-platform, and non-blocking input output (I/O) loop Universal Serial Bus (USB) muxer sequence.

* * * * *